United States Patent
Gladnick (10) Patent No.: US 7,016,525 B2
(45) Date of Patent: Mar. 21, 2006

(54) SYSTEMS AND METHODS FOR CONTINUOUSLY VARYING WAVELENGTH ILLUMINATION

(75) Inventor: Paul G. Gladnick, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 828 days.

(21) Appl. No.: 10/136,476

(22) Filed: May 2, 2002

(65) Prior Publication Data

US 2003/0206650 A1    Nov. 6, 2003

(51) Int. Cl.
*G06K 9/00*    (2006.01)
(52) U.S. Cl. ............... 382/141; 382/141; 382/152; 382/286; 356/237.1; 356/601; 359/798
(58) Field of Classification Search ............... 382/100, 382/141, 152, 254, 274, 286; 356/394, 237.1, 356/240.1, 601, 430; 348/125, 131; 359/798; 396/155, 200; 362/16; 250/205, 226
See application file for complete search history.

(56) References Cited

U.S. PATENT DOCUMENTS

| | | | |
|---|---|---|---|
| 5,646,399 A | 7/1997 | Fukushima et al. | 250/226 |
| 5,793,545 A * | 8/1998 | Monfre et al. | 359/891 |
| 6,152,577 A | 11/2000 | Rizkin et al. | 362/281 |
| 6,201,892 B1 * | 3/2001 | Ludlow et al. | 382/149 |
| 6,414,743 B1 * | 7/2002 | Nishi et al. | 355/69 |
| 6,542,180 B1 * | 4/2003 | Wasserman et al. | 348/131 |
| 6,603,874 B1 * | 8/2003 | Stern et al. | 382/144 |
| 6,627,863 B1 * | 9/2003 | Wasserman | 250/205 |
| 6,690,473 B1 * | 2/2004 | Stanke et al. | 356/601 |
| 6,693,293 B1 * | 2/2004 | Oomori et al. | 250/559.4 |

OTHER PUBLICATIONS

U.S. Appl. No. 09/484,897, filed Jan. 18, 2000, Wasserman et al.
U.S. Appl. No. 09/736,187, filed Dec. 15, 2000, Wasserman.
U.S. Appl. No. 09/921,886, filed Aug. 6, 2001, Silber et al.
U.S. Appl. No. 09/987,986, filed Nov. 16, 2001, Tessadro.
Morelli, "Variable Filters", Interference Filter Handbook, OCLI—Optical Laboratory, Inc., 1998.

* cited by examiner

*Primary Examiner*—Sheela Chawan
(74) *Attorney, Agent, or Firm*—Oliff & Berridge, PLC (57) ABSTRACT

Systems and methods for operating a vision system to provide a desired illumination wavelength for an inspection operation on workpiece include illuminating a workpiece using narrowband illumination from a continuously variable filter, and modifying the narrowband illumination and evaluating resulting images until a narrowband illumination is found that reliably supports the inspection operation. The initial narrowband illumination may be based on spectral sensing.

37 Claims, 8 Drawing Sheets

SYSTEMS AND METHODS FOR CONTINUOUSLY VARYING WAVELENGTH ILLUMINATION

BACKGROUND OF THE INVENTION

1. Field of Invention

This invention relates to precision wavelength illumination selection for a machine vision system.

2. Description of Related Art

Conventional machine visions systems perform dimensional measurements of specific target features of a sample workpiece. Such an application is applied, for example, in measuring the position or other characteristic of specific target features of a sample workpiece for comparison to a standard or reference value of the position or other characteristic of the workpiece. In such an application, for different surface colors or color patterns that overlap, appropriate selection of color illumination can enhance the image contrast between different portions of such multi-colored targets. One system for measuring a pattern or feature places a target to be observed on a stage. Thereafter, full spectrum illumination is used by shining a beam of light from a halogen lamp, for example, onto the target and then measuring the target features. However, discriminating between overlapping features can be difficult because the contrast between the features is poor when using full spectrum illumination.

Another system for measuring a feature uses a plurality of discrete light sources, each of which emits a beam of light having a different color. To obtain a desired illumination setting, the current or voltage to each of the plurality of light sources is varied until the combination of the beams of light create the desired illumination setting.

It is also known to illuminate workpieces with light passing through one or more filters of a set of candidate filters to create a desired wavelength illumination that will be applied to a specific target feature. One such system is disclosed in, for example, U.S. Pat. No. 6,152,577 to Rizkin et al., which discloses a remote illumination system. The system of the 577 Patent uses a movable device with different color filters placed in each of a number of equally spaced openings. When selecting a particular color of illumination, the device is moved until the desired filter is selected. However, this system is problematic in that the amount of illumination settings available is limited to the number of openings in which a filter can be placed. Thus, desired illumination is not easily obtained if the opening does not have that specific color filter.

SUMMARY OF THE INVENTION

The problems associated with using a plurality of light sources or filters involves the initial size, cost and ongoing expense in maintaining the operation of multiple light sources or filters. Also, selecting, balancing and combining such light sources or filters to achieve a particular color or illumination effect is not an intuitive process for the average machine vision user. Also, analyzing such combinations to determine desired illumination, as well as simply accomplishing the physical motions to configure the combinations, is relatively time consuming in comparison to the other operations of a modem high-speed machine vision system, and may easily become the factor that limits the throughput of such systems, thus reducing their economic value. Furthermore, for precision inspection and edge detection, selecting and applying a precise wavelength of illumination may be critical to the accuracy of measurement.

For application to general purpose commercial machine vision systems, it is highly desirable that the widest possible variety of illumination colors be available for selection. Furthermore, it is desirable that the illumination colors can be configured or selected using a compact, simple and high speed device. Furthermore, it is desirable or necessary that the various image processing methods and illumination methods incorporated into the system can be set up and operated for particular images by relatively unskilled users, that is, users who are not skilled in the field of illumination and image processing. Thus, it is a particular problem to create a machine vision system with which dimensional measurements of specific target features can be performed in a versatile, robust, fast and relatively precise way, while at the same time adapting and governing that machine vision system dimension measurements process through the use of a simple user interface that is operable by a relatively unskilled operator.

Thus, considering the aforementioned problems of full spectrum illumination, multiple colored discrete light sources and the multiple colored discrete filters, conventional methods do not offer reasonable solutions for determining the most desirable illumination setting for measuring specific target features. Thus, there is a need for simple and high speed methods or devices that accurately determine and/or set a desired illumination setting to allow a plurality of target features to be distinguished.

This invention provides systems and methods that accurately determine desired illumination settings for a one or more of different characteristics of the image.

This invention separately provides systems and methods that accurately determine illumination settings by detecting different absorption properties.

This invention separately provides systems and methods that accurately determine and provide illumination settings while using a single continuously-variable filter element.

This invention separately provides systems and methods where the illumination setting is set by scanning a beam of light from a broad-spectrum illumination source relative to a spectral filter until the desired illumination is obtained.

This invention separately provides systems and methods that store illumination settings for target features determined from a reference workpiece.

This invention separately provides systems and method for comparing target features of a sample workpiece under a desired illumination with target features determined from a reference workpiece.

In accordance with the systems and methods according to this invention, a machine vision system sets a rapidly variable illumination filter in relation to a target feature of a workpiece, a boundary detection tool or the like determines an image characteristic of the workpiece as a basis for selecting the illumination setting, and the selected illumination setting is stored for use when measuring target features of similar workpieces. When determining the image characteristics of a workpiece under various illuminations, any tool of the vision system (also referred to an image tools or image analysis tools herein), such as a light setting tool, dual area contrast tool, edge tool, multi-channel light tool, as well as any other tool, can be used in defining a region of interest and setting the image characteristic criteria for selecting the illumination settings. Alternatively, the output of a special color-sensitive detector may be used together with image data, or separately, as a basis for selecting the illumination settings.

When obtaining a desired illumination setting, a variable filter is moved relative to a beam of light to obtain various illumination settings. The characteristics of images obtained using various illumination settings are thereafter compared to the determined characteristics of an image of a workpiece such that an illumination setting, which generates an image having the characteristics that most closely matches or optimizes one or more desired characteristics, is selected. In various exemplary embodiments, once the illumination setting has been selected for a reference workpiece, the illumination setting is then stored or applied to a sample workpiece to measure target features of the sample workpiece. Thus, the sample workpiece can be measured to determine if the target features of the sample workpiece match the target features of the reference workpiece, or a set of ideal specifications associated with the reference workpiece.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
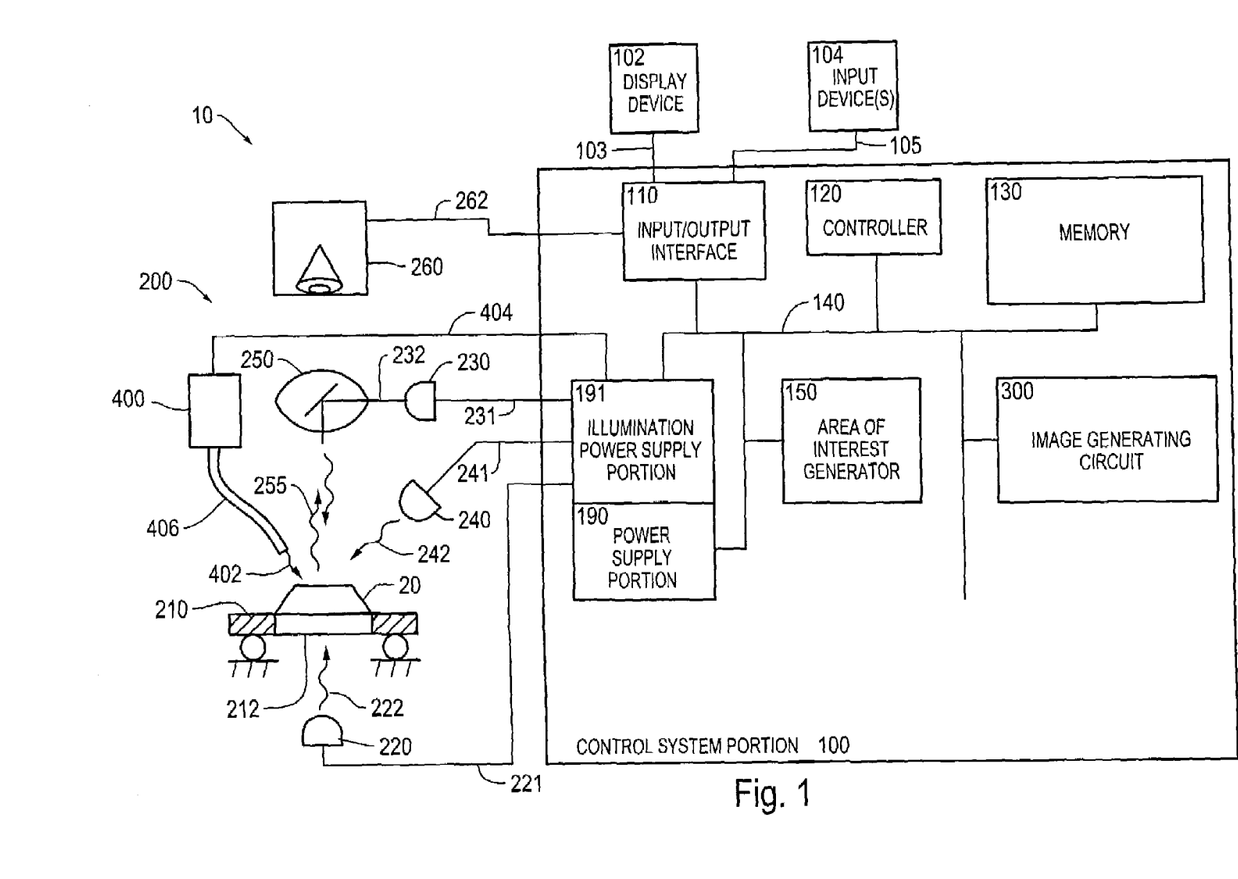
FIG. 1 is a first exemplary block diagram of a vision system usable with the filter systems and methods according to this invention.

For simplicity and clarification, the operating principles and design factors of this invention are explained with reference to one exemplary embodiment of a vision system according to this invention, as shown in FIG. 1. The basic explanation of the operation of the vision system shown in FIG. 1 is applicable for the understanding and design of any vision system that incorporates the illumination selection systems and methods according to this invention.

FIG. 1 shows one exemplary embodiment of a vision system 10 incorporating one exemplary embodiment of the tuned illumination systems and methods according to this invention. As shown in FIG. 1, the vision system 10 includes a control system portion 100 and a vision system components portion 200. The vision system components portion 200 includes a stage 210 having a central transparent portion 212. A workpiece 20 to be imaged using the vision system 10 is placed on the stage 210. One or more of the light sources 220, 230 and 240 emits source light 222, 232, or 242, respectively, usable to illuminate the workpiece 20. Light arising from the source lights illuminates the workpiece 20 and is reflected or transmitted as workpiece light 255, which passes through a lens system 250 and is gathered by a camera system 260, which together act as an imaging system to generate an image of the workpiece 20. The image of the workpiece 20, captured by the camera system 260, is output on a signal line 262 to the control system portion 100. The light sources 220–240 used to illuminate the workpiece 20 include a stage light 220, a coaxial light 230, and a surface light 240, such as a ring light or a programmable ring light, all connected to the control portion 100 through connecting lines or buses 221, 231 and 241, respectively. As a primary optical assembly of the vision system 10, the lens system 250 may in include, in addition to lenses, other optical elements such as apertures, beamsplitters and the like, such as may be needed for providing coaxial illumination, or other desirable vision system features.

The distance between the stage 210 and the lens system 250 and/or camera system 260 can be adjusted to change the focus of the image of the workpiece 20 captured by the camera system 260. In particular, in various exemplary embodiments of the vision system 10, the position of the lens system 250 and/or camera system 260 along a vertical axis is changeable relative to a fixed stage 210. In other various exemplary embodiments of the vision system 10, the position of the stage 210 along the vertical axis can be changed relative to a fixed lens system 250 and/or camera system 260. In further various exemplary embodiments of the vision system 10, the vertical positions of both the camera system 260 and the stage 210 can be altered to maximize the focus range of the vision system 10.

As shown in FIG. 1, one exemplary embodiment of the control portion 100 includes an input/output interface 110, a controller 120, a memory 130, an area of interest generator 150, and a power supply 190 including an illumination power supply portion 191, each interconnected either by a data/control bus 140 or by direct connections between the various elements. The connecting lines or buses 221, 231 and 241 of the stage light 220, the coaxial light 230, and the surface light 240, respectively, are all connected to the illumination power supply portion 191. The signal line 262 from the camera system 260 is connected to the input/output interface 110. In addition to carrying image data, the signal line 262 may carry a signal from the controller 120 or the image generating circuit or routine 300 that initiates image acquisition. Also, a display device 102 can be connected to the input/output interface 110 over a signal line 103. One or more input devices 104 can be connected to the input/output interface 110 over one or more signal lines 105. The display device 102 and the one or more input devices 104 can be used to view, create and/or modify part programs, to view the images captured by the camera system 260 and/or to directly control the vision system components portion 200. However, it should be appreciated that, in a fully automated system having a predefined part program, the display device 102 and/or the one or more input devices 104, and the corresponding signal lines 103 and/or 105, may be omitted.

The memory portion 130 stores data usable to operate the vision system components portion 200 to capture an image of the workpiece 20 such that the input image of the workpiece 20 has desired image characteristics. The memory portion 130 further stores data usable to operate the vision system 10 to perform various inspection and measurement operations on the captured images, either manually or automatically, and to output the results through the input/output interface 110. The memory 130 also contains data defining a graphical user interface operable through the input/output interface 110.

As shown in FIG. 1, the vision system 10 also includes an image generating circuit or routine 300. The image generating circuit or routine 300 is usable to determine image acquisition settings and/or acquire an image of the workpiece 20 such that the input image of the workpiece 20 has desired image characteristics in a region of interest. The image generating circuit or routine 300 can use a tool, such as a dual area contrast tool, an edge tool or a multi-channel lighting tool, as variously disclosed in U.S. patent application Ser. No. 09/484,897, filed Jan. 18, 2000, Ser. No. 09/736,187, filed Dec. 15, 2000, Ser. No. 09/921,886, filed Aug. 6, 2001 and Ser. No. 09/987,986, filed Nov. 16, 2001, each of which is incorporated herein by reference in its entirety. The term image characteristic as used herein, in various exemplary embodiments refers to relatively high level image results, such as texture characteristics, edge characteristics and the like which support the proper operation of various image tools, such as the aforementioned dual area contrast tool, edge tools and the like. The term image characteristic as used herein, furthermore includes within its scope the various determined parameters, operation results, and combinations of results underlying various vision system tools, including the various determined parameters, operation results, and combinations of results referred to as image results in the various references incorporated herein. Additional exemplary tools and methods usable in combination with this invention are evident in commercial machine vision systems such as the Quick Vision series of vision inspection machines and QVPAK software available from Mitutoyo America Corporation (MAC), located in Aurora, Ill. However, it should be appreciated that any such tool, whether currently available or later developed, can be used to determine image acquisition settings and/or acquire an image of the workpiece 20 having desired image characteristics in a region of interest.

Figure 2:
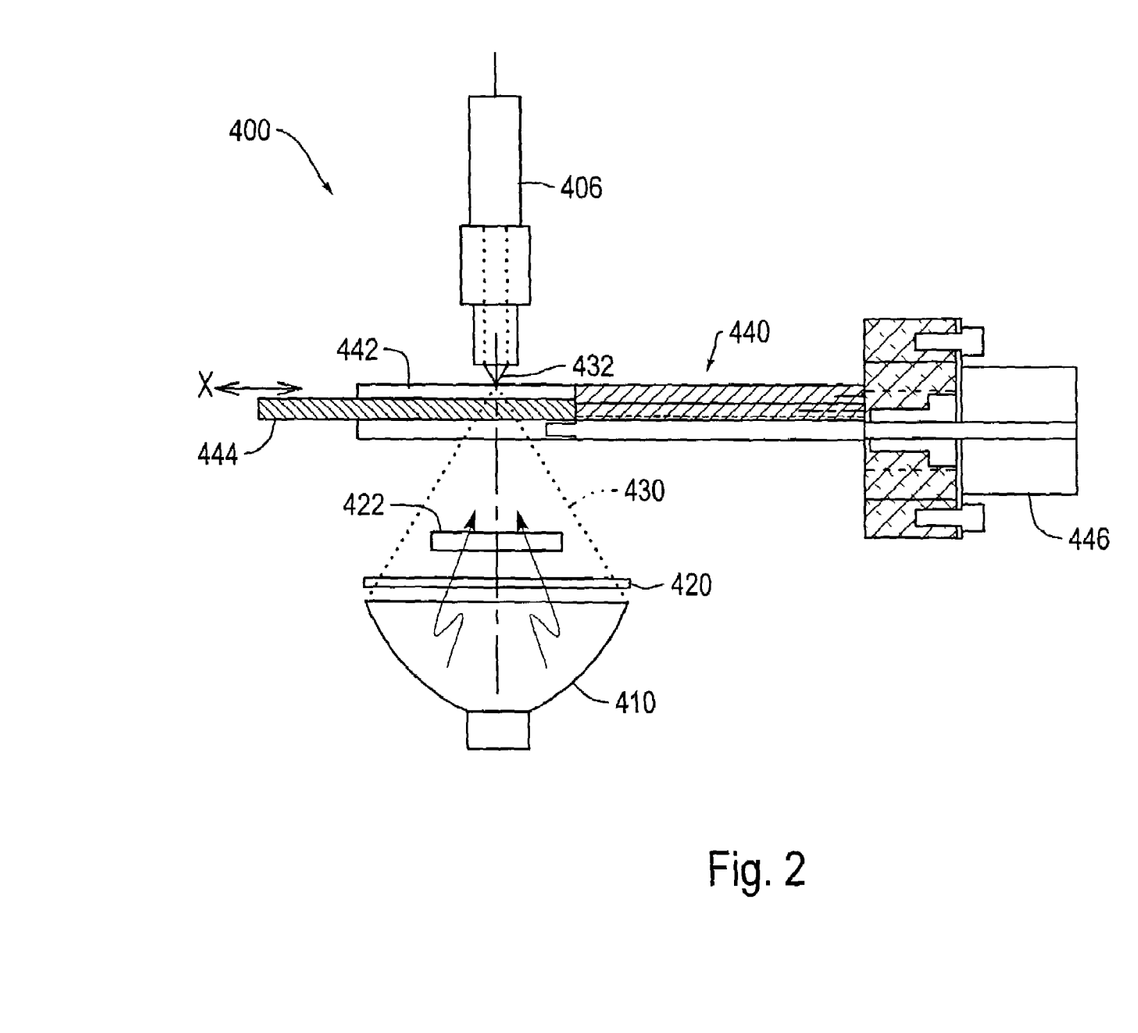
FIG. 2 illustrates a detailed exemplary embodiment of the filter system of FIG. 1 usable with the vision system according to this invention.

As shown in FIGS. 1 and 2, the vision system components portion 200 of the vision system 10 also includes an illumination filter system 400 connected to the illumination power supply portion 191 by connecting line or bus 404. The filter system 400 emits a beam of light which may be directed to a region of interest of the workpiece in the field of view of the camera system 260 using a fiber optic line 406, which may include lens or the like (not shown) for focusing the emitted source light 402. In various exemplary embodiments, the connecting line or bus 404 carries signals that control the wavelength and intensity of the light emitted by the filter system 400 and signals that indicate a position or other state of the filter system 400 to the controller 120 of the control system portion 100. It should be appreciated that in various exemplary embodiments, the filter system 400 can provide an illumination source in addition to the light sources 220–240, or alternatively one or more fiber optic lines similar to fiber optic line 406 could be routed to one or more locations suitable for replacing any or all of the light sources 220–240. It should be further appreciated that both the wavelength and the intensity of the light emitted by the filter systems 400 may be adjusted and/or selected based on an image characteristic in a region of interest imaged by the camera system 260, or based on a spectral sensing result, as described further below.

As shown in FIG. 2, one exemplary embodiment of the filter system 400 includes a halogen lamp 410, a first filter 420, a second filter 422 and a variable filter apparatus 440. The variable filter apparatus 440 includes a positioning carrier 442, a linear variable filter plate 444 mounted on the carrier 442, and a motor 446. In contrast to systems using discrete filter elements, the filter system 400 provides an essentially unlimited choice of illumination wavelengths for a vision system in a compact package. Furthermore, the illumination wavelength is controlled by a simple and intuitive manner, rather that by configuring a complex combination of filters. Furthermore, the illumination wavelength may be controlled and varied at relatively high speeds, allowing illumination optimization and/or selection techniques which were previously impractical for many machine vision applications.

The halogen lamp 410 emits a beam of light 430 through the first filter 420 and the second filter 422. The first filter 420 and the second filter 422 are heat-absorbing filters used to absorb heat from the beam of light 430. In other exemplary embodiments, one filter or additional filters or any other device currently available or later developed heat-absorbing filter can be used. Alternatively, solid state lights sources or like may be used in place of the halogen lamp 410 without heat-absorbing filters. More generally, any combination of light source and heat filters may be used such that the amount of heat included in the beam of light 430 when it passes through the linear variable filter plate 444 is compatible with the linear variable filter and the remainder of the vision system components portion 200.

The linear variable filter plate 444 is positioned in the beam of light 430 and in front of the input of the fiber optic line 406. In various exemplary embodiments, the linear variable filter plate 444 includes a linear variable interference filter with a spectral range from about 400 to about 700 nm distributed along a linear dimension of approximately 42 mm. Thus, a linear dispersion of 7.1 nm/mm is created. Other exemplary filter plates and related functions are described further below with reference to FIGS. 8A and 8B. However, as should be appreciated, any linear variable filter can be used to create any desired linear dispersion. For example, the variable filters disclosed in *Variable Filters,* by Dennis W. Morelli, which is incorporated herein by reference in its entirety, can be used. It should be further appreciated that the spectral bandwidth emitted by a particular exemplary embodiment of the linear variable filter plate 444 can be controlled by achieving a specified spot size of input illumination at the linear variable filter plate 444. For example, a deflector which creates a particular shape and spacing for the beam of light 430 emitted by the halogen lamp 410 can be used, or a lens to suitable adjust the spot size can be used.

As shown in FIG. 2, the linear variable filter plate 444 is mounted on the positioning carrier 442. The carrier 442 is movable along the X-direction by the motor 446, which is controlled by the controller 120 over the bus 404 and/or bus 140. The movement of the linear variable filter plate 444 is controlled by the motor 446 such that the linear variable filter plate 444 can be precisely positioned to create a desired wavelength for the beam of light 432 by passing the beam of light 430 through a selected portion of the linear variable filter plate 444. In various exemplary embodiments, the positioning carrier 442 may include a bearing system and an actuator such as a worm gear drive system or the like. A position encoder may be included to provide position feedback in various exemplary embodiments. In various other exemplary embodiments, the motor 446 is a digitally controllable motor and receives motion control signals over the connecting line or bus 404. Alternative, the motor receives drive pulses or voltages or the like that directly control its motion. A variety of usable motion control alternatives are well known and/or commercially available with a variety of speeds and resolutions usable in various exemplary embodiments according to the principles of this invention. Thus, any currently available or later developed device can be used such that the linear variable filter plate 444 can be quickly and controllably positioned relative to the beam of light 430 by that device.

After passing through the linear variable filter plate 444, the beam of light 432 is input to one end of the fiber-optic line 406 and output from the other end of the fiber optic line 406, as the source light 402. When output from another end of the fiber-optic line 406, the beam of source light 402 illuminates the target 20. It should be appreciated that, by using a fiber optic line 406, the filter system 400 can be located at any convenient location. Furthermore, heat generated by the halogen lamp 410 can be isolated remotely from sensitive components of the vision system 10. However, the heat generated by the halogen lamp 410 can be avoided by using a solid state light source or a fiber optic light source in place of the halogen lamp 410, for example. In such cases, the filter system 400 may be located at a closer proximity to the workpiece 20 and/or the fiber optic line 406 can be omitted. As should be appreciated, light can be projected to the workpiece 20 by other methods and components.

It should be further appreciated, that although a linear variable filter may offer certain advantages regarding the illumination characteristics provided, a circular variable filter arrangement, such as that described further below with reference to FIG. 8C, may also be employed within the scope of this invention. For example, the elements shown in FIG. 8C, can be operably positioned to replace the variable filter apparatus 440 shown in FIG. 2

Figure 3:
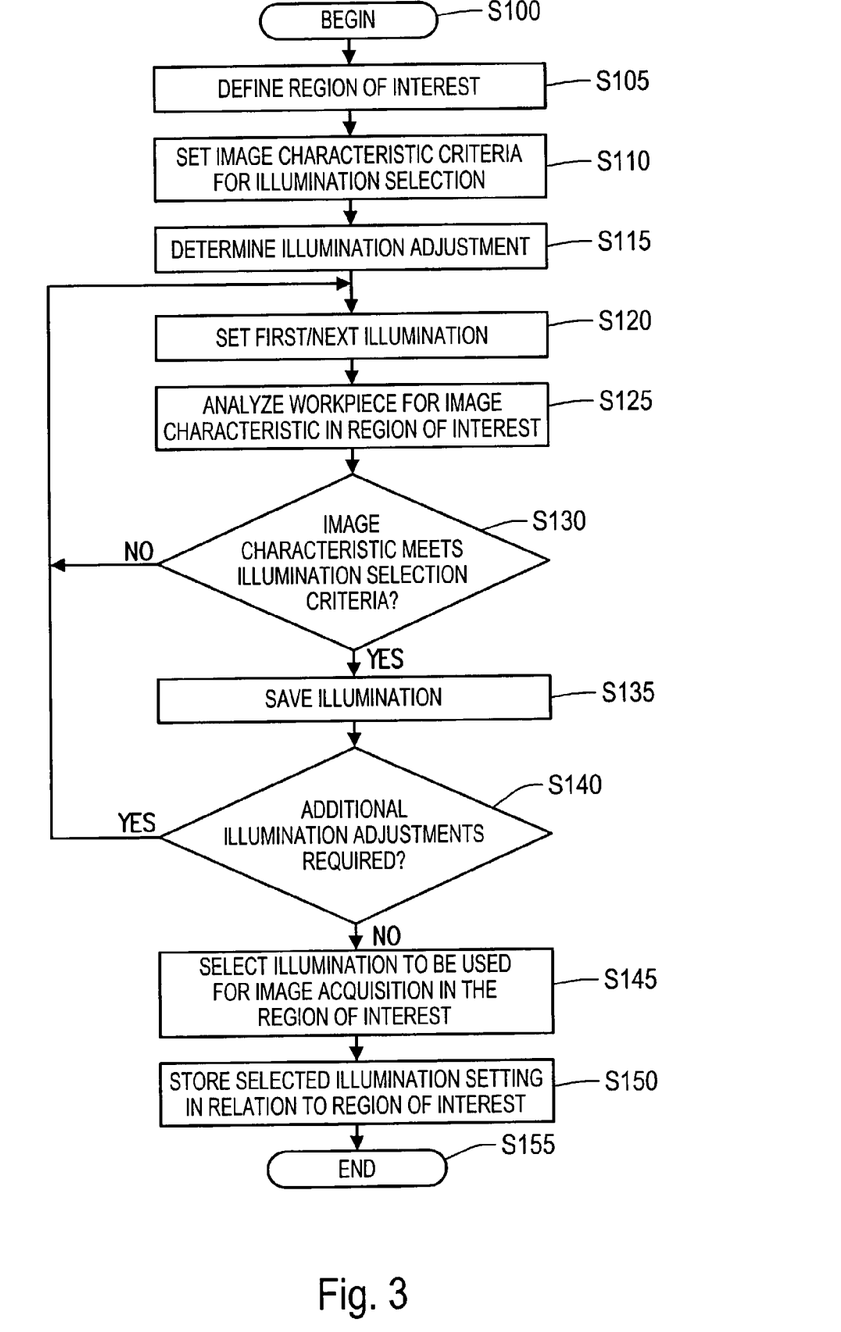
FIG. 3 is a flowchart outlining one exemplary embodiment of a method for determining illumination settings according to this invention.

FIG. 3 is a flowchart outlining one exemplary embodiment of a method for determining and storing the illumination settings of a filter system according to this invention. Such a method would be commonly used during a learning/teaching mode of operating a vision system, while developing a part program for inspecting a number of similar parts. It should be appreciated that a particular filter system according to this invention may used to illuminate a region of interest in combination with one or more other lights sources of the vision system, which may themselves incorporate one or more other filter systems according to this invention. Exemplary methods for determining desirable combinations of light sources are disclosed in the incorporated 187 and 886 applications. Thus, in various exemplary embodiments, the operations described below with reference to FIG. 3 are applicable to each instance of determining and storing the illumination settings of a filter system according to this invention. Furthermore, these operations may be embedded in a larger sequence of operations which determines an overall lighting combination or lighting vector usable to provide desirable illumination for a region of interest.

As shown in FIG. 3, operation of the method begins in step S100, and proceeds to step S105, where an area of interest within the input image is defined, for example by an image processing tool positioned on the image by a user or alternatively by an automatic program. Then, in step S110, the image characteristic criterion or criteria for illumination selection is set. For example, commonly used image characteristics may include the brightness and/or intensity gradient and/or contrast surrounding an edge or other feature in a region of interest. These and other image characteristic criteria for illumination selection may be set, for example, using the methods disclosed for a dual area contrast tool, an edge tool, or multi-channel lighting tool as disclosed in the incorporated 897, 187, 886 and/or 986 applications. Operation then continues to step S115.

In step S115, an illumination adjustment parameter, or a set of parameters, or an adjustment scheme, is selected or determined manually, semi-automatically or automatically. In one simple exemplary embodiment, an illumination adjustment which is a default increment for one or more illumination parameters of the illumination filter system is initialized automatically. This adjustment increment may correspond to a wavelength step size, which corresponds to a position change of a variable filter relative to an input illumination spot, for example. In various other exemplary embodiments, an intensity adjustment increment is also selected or determined. Various other exemplary adjustment schemes are described below. Then, in step S120, a first illumination is set by placing the beam of light having a broad spectrum at a corresponding first position on a linear variable filter of the filter system. Then, in step S125, the resulting image characteristics in the region of interest of the reference workpiece are analyzed. As should be appreciated, the image characteristic analysis can be performed automatically, semi-automatically or manually by the operator. However, for explanatory purposes, the analysis will be performed automatically.

In step S130, a determination is made as to whether the illumination setting of the beam of light provides an image that sufficiently matches the one, or more, of the image characteristic criteria, as set in step S110, in the region of interest of the reference workpiece. If the illumination setting of the beam of light provides an image that sufficiently matches the image characteristic criteria, operation proceeds to step S135. Otherwise, operation returns to step S120, and the filter is moved relative to the beam of light according to the illumination adjustment increment set in step S115. In step S135, the illumination setting which provides an image that sufficiently matches the image characteristic criteria within the region of interest of the reference workpiece is saved. In various exemplary embodiments, one or more related image characteristics or results are also saved in association with the illumination setting.

In step S140, a determination is then made as to whether additional illumination adjustments in the region of interest of the reference workpiece are required. This determination may be made manually (based on a user observing an image result, for example) or automatically. This determination may also depend on the parameters, or adjustment scheme, selected or determined in step S115. If additional illumination adjustments are required, the operation returns to step S120. Otherwise, operation proceeds to step S145.

In step S145, if more than one illumination setting has provided an image that sufficiently matches the image characteristic criteria, the final illumination setting to be used to acquire a desired image of the reference workpiece in the region of interest is selected or determined. Then, in step S150, the illumination setting or settings saved in step S135 is stored in relation to the region of interest, in a part program file or the like. Operation then continues to step S155, where operation of the method ends.

In the foregoing operations, it should be appreciated that a variety of illumination adjustment parameters and/or an adjustment schemes may be implemented in various exemplary embodiments. For example, in one exemplary embodiment, a wavelength adjustment step parameter is set by default to the finest level which supports the desired throughput or response time of the vision system, and the wavelength is stepped over a predetermined range regardless of whether an image is found that sufficiently matches the image characteristic criteria. Then, the illumination setting corresponding to the best result is selected as the final illumination setting.

In another exemplary embodiment, the wavelength is stepped until an illumination setting is found that sufficiently matches the image characteristic criteria, and no additional illumination adjustments are evaluated. In yet another exemplary embodiment, the wavelength is first coarsely stepped until a preliminary illumination setting is found that sufficiently matches the image characteristic criteria, and then the wavelength is finely stepped or continuously scanned in a restricted range surrounding the preliminary illumination setting until an illumination setting is found that optimizes the image characteristic criteria. In yet another exemplary embodiment, the wavelength is first selected according to one of the foregoing schemes using a nominal intensity of input illumination, and the intensity is then subsequently varied until the intensity setting is found that provides the best image characteristic. Further variations and schemes currently available or later developed for adjusting and selecting the illumination settings for a filter systems according to this invention can be used.

It should be appreciated that the operations described above with reference to FIG. 3, in combination with a filter system according to this invention, provide a system that is particularly suitable for inspecting workpieces that have multiple overlapping features such as surface colors, color pattern features and/or physical edges and the like in a region of interest. For example, a colored and/or textured watermark may be applied over a printed background pattern, with both the watermark and the background requiring inspection. As another example, a variegated plastic mix may be used to form the physical edge of a molded workpiece, obscuring the physical edge or making it appear irregular. Appropriate selection of color illumination can enhance the image or contrast of one of the overlapping features in the region of interest while suppressing the appearance of differently colored features. Thus, it should be further appreciated that in various exemplary embodiments, the operations described with reference to FIG. 3 are applicable to each instance of determining and storing the illumination settings of a filter system according to this invention, including each separate instance associated with each of the various overlapping features which may be inspected in the same region of interest.

Figure 4:
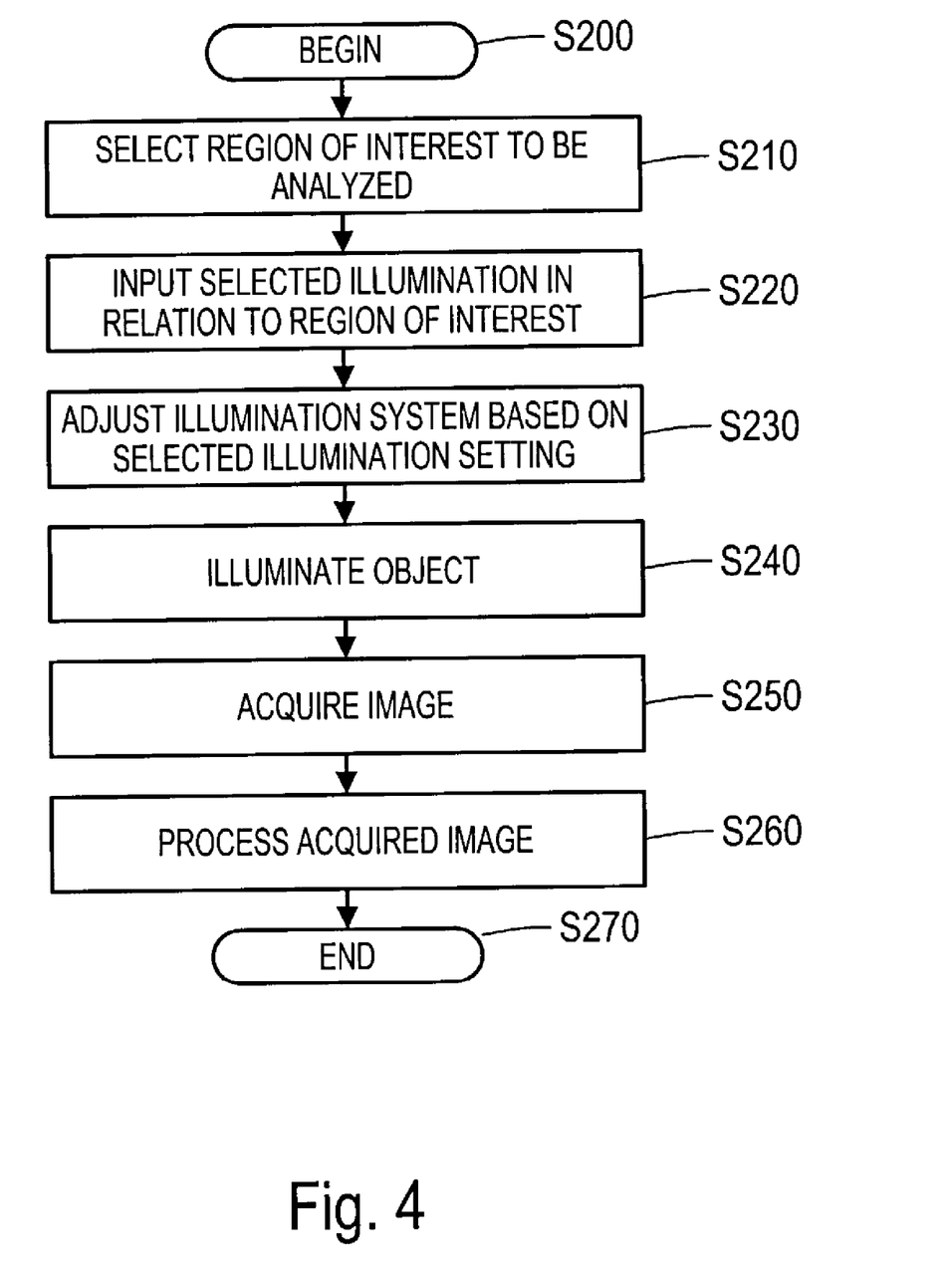
FIG. 4 is a flowchart outlining one exemplary embodiment of a method for applying illumination settings to a sample workpiece according to this invention.

FIG. 4 is a flowchart outlining one exemplary embodiment of a method for applying stored illumination settings to image a workpiece having a region of interest comparable to the reference workpiece used to determine the settings. Such a method would be commonly used during the execution of a part program for automatically inspecting a number of similar parts.

Operation begins in step S200, and proceeds to step S210, where a region of interest of the workpiece is selected to be analyzed. Then, in step S220, the stored illumination settings corresponding to the selected region of interest of the workpiece are read from the memory. Next, in step S230, the illumination system is adjusted based on the selected illumination setting. Operation then continues to step S240.

In step S240, the workpiece to be imaged is illuminated by the adjusted illumination system. Next, in step S250, the image of the workpiece is acquired. Then, in step S260, the acquired image is processed. Operation then continues to step S270, where operation of the method ends.

Similarly to the discussion of FIG. 3, it should be appreciated that in various exemplary embodiments, the operations described with reference to FIG. 4 are applicable to each instance of applying stored illumination settings of a filter system to image a workpiece according to this invention, including each separate instance associated with each of the various overlapping features which may be imaged and/or inspected in the same region of interest.

Figure 5:
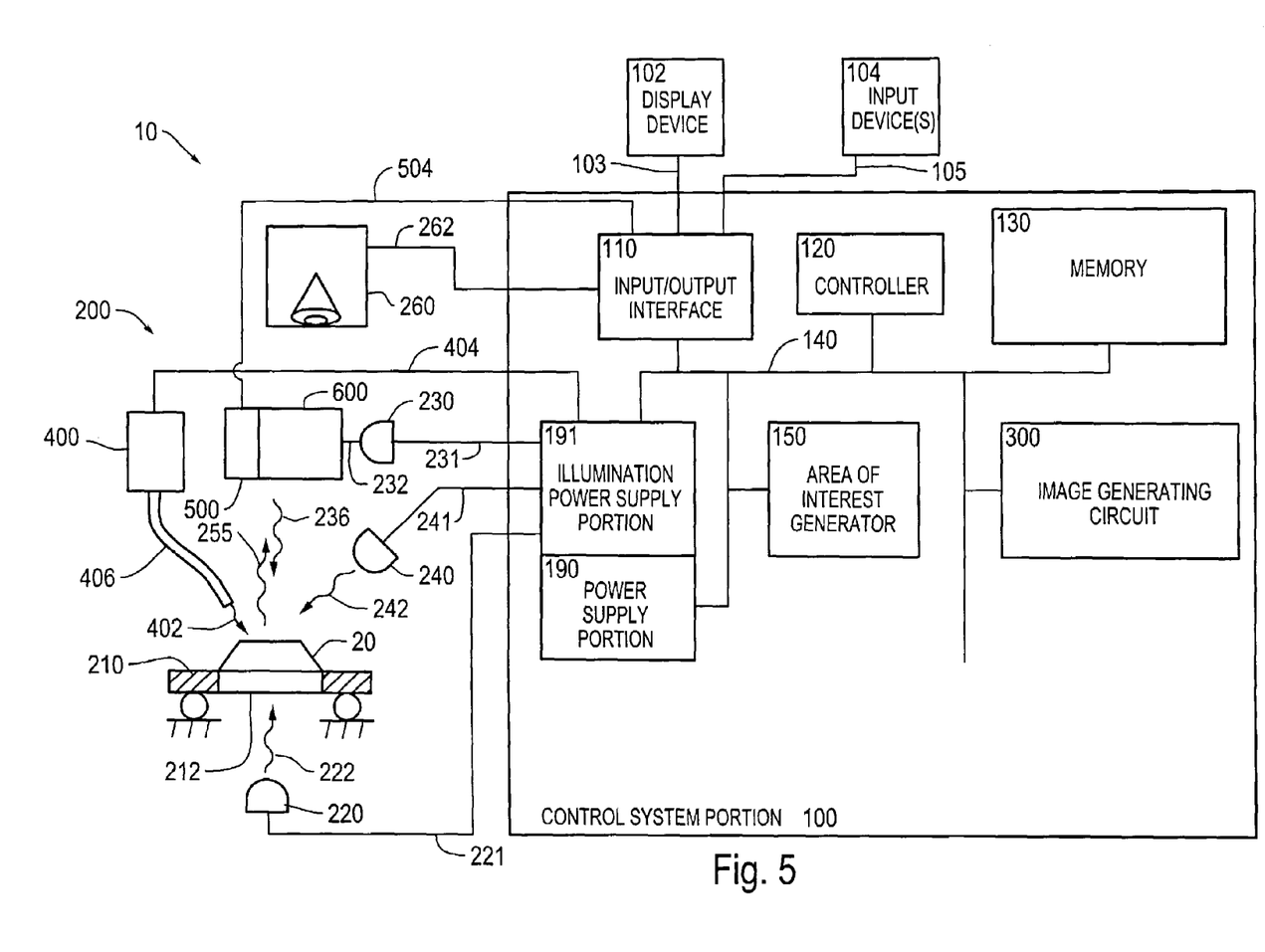
FIG. 5 is a second exemplary block diagram of a vision system usable with filtering systems and methods according to this invention.

FIG. 5 shows a second exemplary embodiment of a vision system 10 incorporating a second exemplary embodiment of the tuned illumination systems and methods according to this invention. The vision system 10 of the second exemplary embodiment is similar to the vision system as shown in FIG. 1. However, in this second exemplary embodiment, the vision system 10 incorporates a second exemplary embodiment of a lens system 600 and a spectral sensor system 500 usable to analyze various color characteristics of the workpiece 20. These characteristics may be used to select candidate illumination wavelengths to be provided by the filter system 400 for inspecting the workpiece 20, for example. The spectral sensor system 500 receives input light arising from the workpiece light 255, performs one or more wavelength-related sensing functions described further below, and exchanges control signals and data over a signal line 504 connected to the input/output interface 110. In various exemplary embodiments, when the spectral sensor system 500 is operating, the workpiece 20 is illuminated with broadband illumination such as may be provided by one of more of the source lights 222, 232, 242, and/or 402. The spectral sensor system 500 may receive light arising from the workpiece light 255 by a direct path from the workpiece 20 (not shown), or by receiving a portion of the workpiece light 255 transmitted through the lens system 600, as shown.

Figure 6:
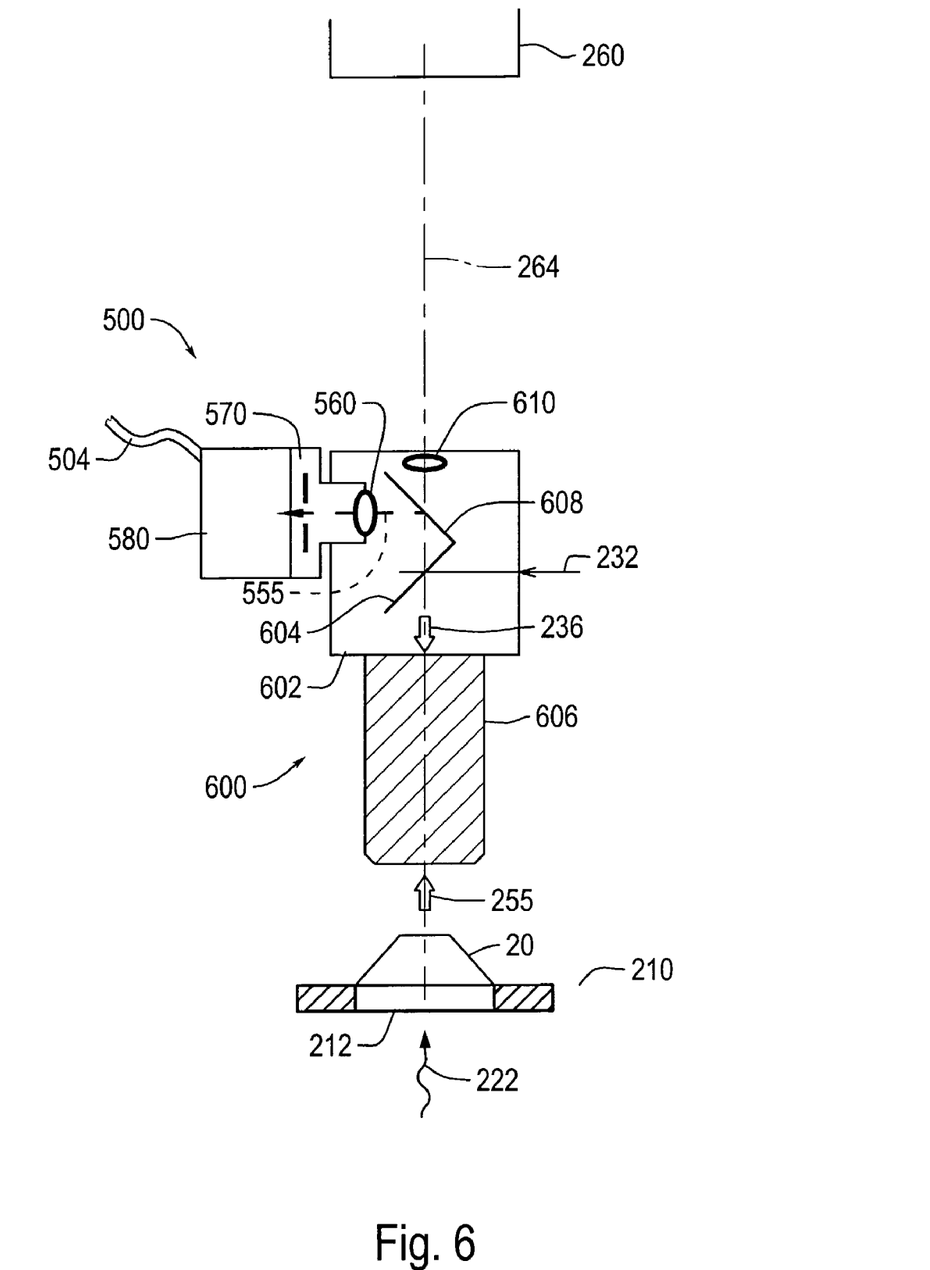
FIG. 6 illustrates a detailed exemplary embodiment of a vision system optical path incorporating a spectral sensor system according to this invention.

FIG. 6 shows one exemplary embodiment of the spectral sensor system 500 which works in cooperation with the second exemplary embodiment of the lens system 600. In the exemplary embodiment shown in FIG. 6, broadband illumination may arise from the source light 222, which provides stage light workpiece illumination for workpieces which are at least partially transmissive or transparent. In this case, the workpiece 20 transmits workpiece light 255. Alternatively, broadband illumination may arise from the source light 232, which provides through-the-lens workpiece illumination by means of a first beamsplitter 604 which redirects the source light 232 to provide the coaxial light 236 along an optical axis 264 of the lens system 600 and camera system 260.

In addition to the first beamsplitter 604, the lens system 600 includes an assembly housing 602, a first lens 606, a second beamsplitter 608 and a second lens 610. The first and second lenses 606 and 610 are configured to provide a magnified image of a field of view of the workpiece 20 on the stage 210. In various exemplary embodiments, the first lens 606 can be removed from the optical assembly housing 602 and be replaced by another lens having one or more different lens elements.

Regardless of the source light used, the first lens 606 of the lens system 600 receives the workpiece light 255 and transmits it through the first beamsplitter 604 and along the optical axis 264. A significant portion of the workpiece light 255 then passes through the second beamsplitter 608 and the second lens 610 and is gathered by the camera system 260 to generate an image of the field of view on the workpiece 20.

A predetermined portion of the workpiece light 255 is also reflected by the second beamsplitter 608. This reflected light 555 passes through a lens 560 and is measured by a spectral sensor 580 of the spectral sensor system 500. The spectral sensor system 500 measures the relative intensities of the major spectral components of the workpiece light 255, thus profiling the color properties of the workpiece 20 in the field of view.

In various other exemplary embodiments, an optional aperture selection mechanism 570 is included with the spectral sensor system 500. The mechanism 570 can enlarge or narrow the field of view of the spectral sensor system 500 and is usable to select a region of interest in the field of view on the workpiece 20 to be analyzed by the spectral sensor 580. The remainder of the workpiece and/or image is excluded so that the spectral analysis is approximately feature-specific. In one exemplary embodiment, the mechanism 570 simply adjusts the size of a central aperture which is positioned to correspond to the center of the field of view of the camera 260. In this case, a region of interest on the workpiece 20, which may coincide with a tool position and/or a feature to be analyzed, is positioned along the center of the field of view of the camera 260. The mechanism 570 is then operable to select a suitable aperture size and restrict the spectral measurements to a region confined to the centrally located region of interest, tool position and/or feature on the workpiece. An aperture wheel or an adjustable iris may be used according to well-known methods. In a second exemplary embodiment, the mechanism 570 comprises an LCD-type shutter/aperture, with addressable pixels. In this case, a tool position relative to the camera image defines a region of interest, and the pixels of the LCD-type shutter/aperture are controlled over the signal line 504 based on the tool data, in order to restrict the spectral measurements to light corresponding to the region of interest on the workpiece, even if the region of interest in not centered in the field of view.

In another exemplary embodiment, the spectral sensor 580 may include one or more miniature, array-based sensors from the CsxxxLE-FW family of linear variable filter based spectral sensors available from Optical Coating Laboratory Inc., Santa Rosa, Calif. The spectral sensor 580 may further include optical elements as needed to distribute the workpiece light across the sensor surface, as will be apparent to one skilled in the art. Such sensors provide typical photodiode or CCD array inputs and outputs, which may be connected to the signal line 504. The intensity on the array at a particular location corresponds to the workpiece light intensity at a particular wavelength.

Figure 7:
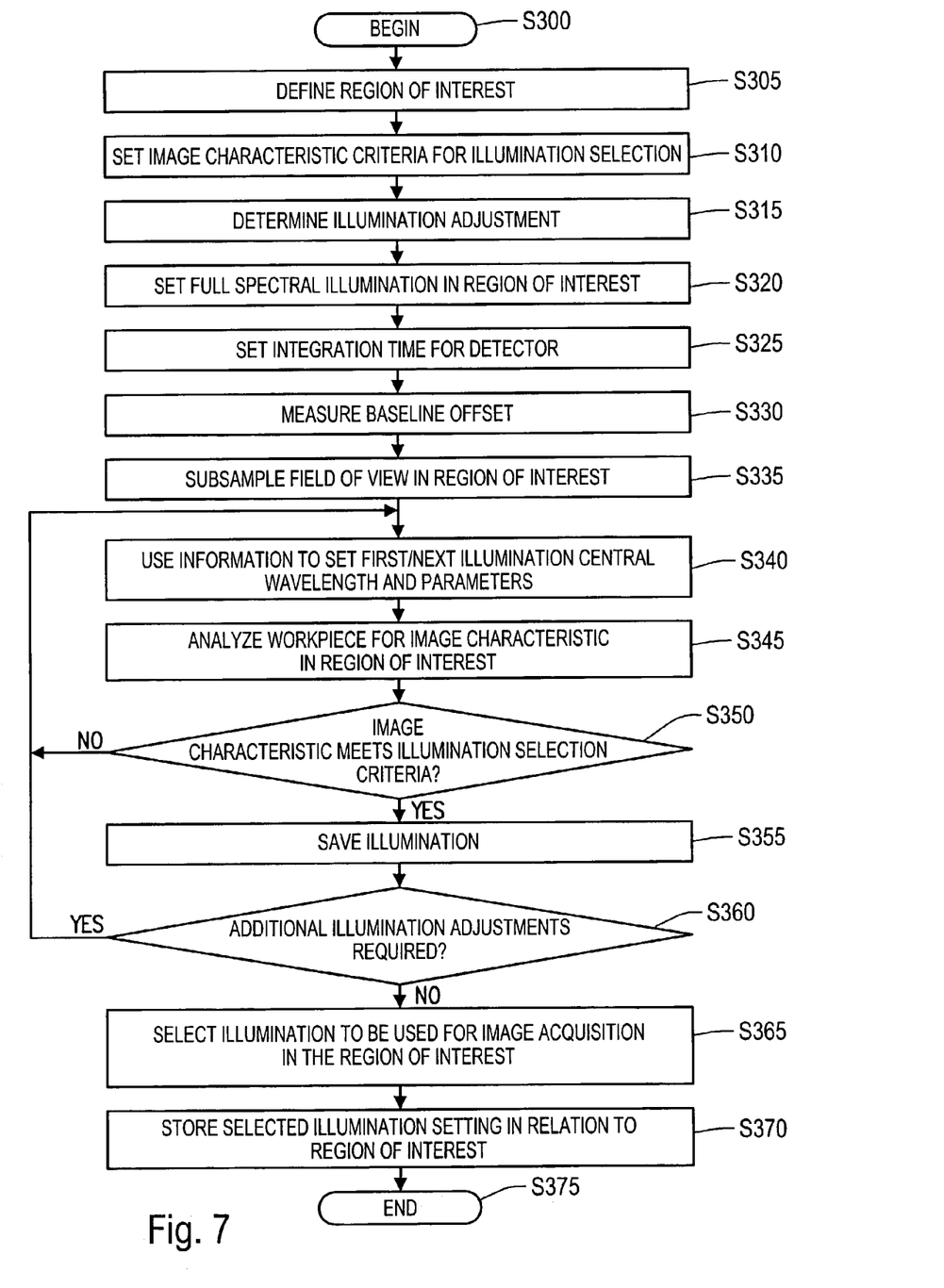
FIG. 7 is a flowchart outlining an additional exemplary embodiment of a method for determining illumination settings according to this invention.

FIG. 7 is a flowchart outlining a second exemplary embodiment of a method for determining and storing the illumination settings of a filter system, according to this invention. Many of the operations described below with reference to FIG. 7 are similar to corresponding operations previously described with reference to FIG. 3. Such operations should be understood to be similar to the corresponding operations described with reference to FIG. 3, and to have similar scope, application and alternatives, unless otherwise indicated below.

Operation of the method begins in step S300, and proceeds to step S305, where an region of interest within the input image is defined. Then, in step S310, the image characteristic criterion or criteria for illumination selection is set. The image characteristics criteria for illumination selection is set by any of the methods described or incorporated by reference elsewhere herein. Next, in step S315, an illumination adjustment parameter, or a set of parameters, or an adjustment scheme, is selected or determined. Operation then continues to step S320.

In step S320, broad spectrum illumination of the reference workpiece, including at least the region of interest, is set. In various exemplary embodiments, the broad spectrum illumination is set using one or more of a stage light, a coaxial light, a programmable ring light and/or any other suitable light source available on the vision system. Operation then continues to step S325.

In step S325, the integration time for a spectral sensor is set. It should be appreciated that the light available to the spectral sensor may be limited, and may vary with at least a magnification of the reference workpiece image and an aperture associated with the spectral sensor. Accordingly, the integration time is chosen to provide good signals from the spectral sensor. Then, in step S330, the baseline offset of the spectral sensor is measured in the absence of the broad spectrum illumination, to compensate for the effects of ambient light and spectral sensor dark current, for example. Operation then continues to step S335. It should be appreciated that the steps S325 and S330 are optional steps that enhance the accuracy of the spectral sensor operations. However, these steps may be omitted, or default values corresponding to a particular vision system design may be used, and the remaining operations of the method described here will still provide significant utility.

In step S335, a sub-sample field of view in the region of interest of the centered workpiece is selected manually or automatically, based on a tool position for example, sampled by the spectral sensor, and the results analyzed. The broad band illumination set in step S320 is used during sampling. The sub-sample field of view can be selected based on aperture selection, a magnification change provided by the operator or automatically, and/or by positioning the reference workpiece in a particular position in the field of view. The sub-sample collected by the spectral sensor is analyzed to determine one or more candidate center wavelengths for a wavelength tunable illumination system such as a filter system according to this invention. In general, the spectral sensor will indicate intensity peaks at one or more wavelengths in dependence on the color of the reference workpiece in the region of interest and, generally, one of these indicates a desirable illumination wavelength. It should be appreciated, as previously described, that workpieces to be inspected may have multiple overlapping features such surface colors, color pattern features and/or physical edges and the like in a region of interest. In general, each overlapping feature may give rise to a corresponding intensity peak at an corresponding wavelength. Operation then continues to step S340.

In step S340, a first or next illumination center wavelength is set based on the results of the operations of step S335 and/or other illumination parameters may be set or adjusted in accordance with the operations or results of step S315. A filter system according to this invention may be used to set the illumination wavelength. In one exemplary embodiment of the operations of step S340, the greatest intensity peak indicated by the results of step S335 is set as the first illumination center wavelength. However, more generally, an intensity peak which is not necessarily the largest peak should be set or selected as the center wavelength corresponding to the particular feature to be emphasized by the illumination. In various exemplary embodiments, one or more intensity peaks above a relative or absolute intensity threshold are determined from the results of step S335 and one of them is set as the first center wavelength of illumination to be used as the basis for images analyzed by the operations of step S345. Other alternative wavelength selection criteria, currently available or later developed, can be used.

Next, in step S345, the resulting image characteristics in the region of interest of the reference workpiece are analyzed. As should be appreciated, the image characteristic analysis can be performed automatically, semi-automatically or manually by the operator. Operation then continues to step S350.

In step S350, a determination is made as to whether the current center wavelength and other illumination setting parameters provides an image that sufficiently matches the one, or more, of the image characteristic criteria, as set in step S310, in the region of interest of the reference workpiece. If the illumination setting provides an image that sufficiently matches the image characteristic criteria, operation proceeds to step S355. Otherwise, operation returns to step S340, where the center wavelength and/or another illumination setting parameter such as illumination intensity or the like, is adjusted. In step S355, the illumination setting which provides an image that sufficiently matches the image characteristic criteria within the region of interest of the reference workpiece is saved. In various embodiments, one or more related image characteristics or results are also saved in association with the illumination setting.

Next, in step S360, a determination is made whether additional illumination adjustments in the region of interest of the reference workpiece are required. Adjustment may be required based on a variety of conditions. This determination may be made manually (based on a user observing an image result, for example) or automatically. This determination may also depend on the parameters, or adjustment scheme is selected or determined in the operations associated with step S315. Additionally, in various exemplary embodiments, a plurality of candidate center wavelengths have been determined as previously described with reference to steps S335 and S340, and the illumination adjustment include selecting adjustments to the center wavelength among the plurality of candidate center wavelengths. In particular, this may be advantageous or necessary when there are multiple overlapping features of various colors or color patterns to be inspected in a single region of interest. If additional illumination adjustments are required, the operation returns to step S340. Otherwise, operation proceeds to step S365.

In step S365, if more than one illumination setting has provided an image that sufficiently matches the image characteristic criteria, the final illumination setting to be used to acquire a desired image of the reference workpiece in the region of interest are selected or determined. Then, in step S370, the illumination setting or settings determined in step S365 is stored in relation to the region of interest, in a part program file or the like. Operation then continues to step S375, where operation of the method ends.

It should be appreciated that, with the apparatus and methods according to this invention described with reference to FIGS. 5–7, a vision system can more quickly determine candidate settings for an illumination filter system, further increasing the utility and application of a illumination filter system according to this invention. In addition, the apparatus of FIGS. 5 and 6 may also be used separately in a vision system, for the purpose of inspecting various color characteristics of a workpiece using broadband illumination.

Figure 8A:
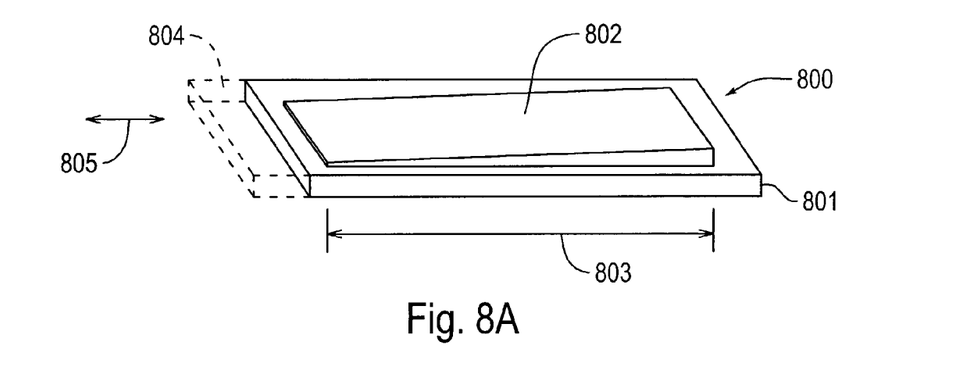
FIG. 8A illustrates a first exemplary embodiment of a filter plate according to this invention.
Figure 8B:
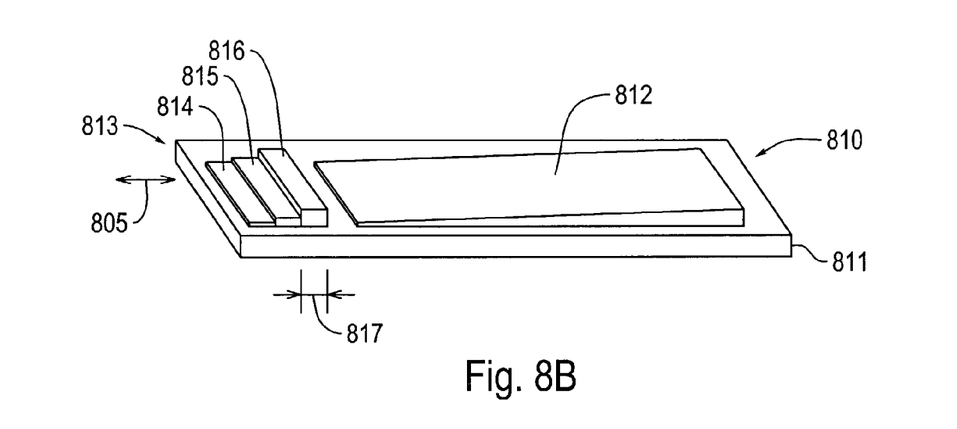
FIG. 8B illustrates a second exemplary embodiment of a filter plate including a stepped wavelength portion according to this invention.
Figure 8C:
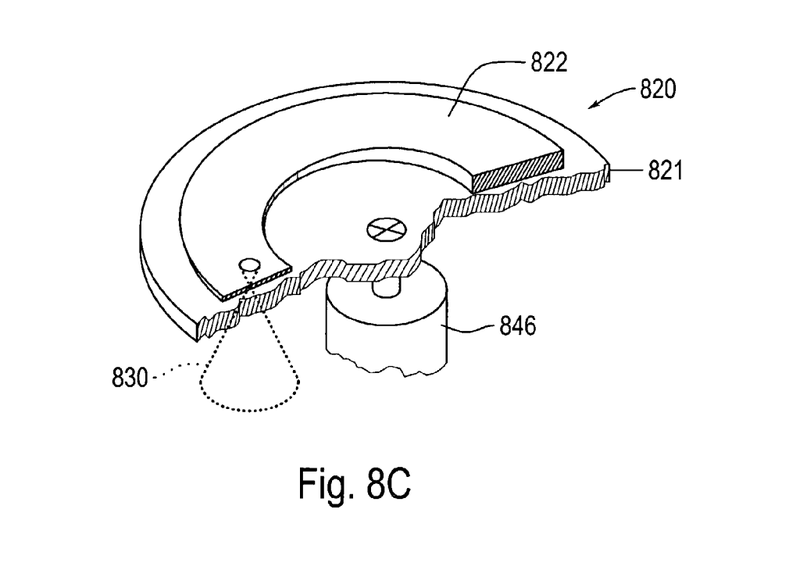
FIG. 8C illustrates a third exemplary embodiment of a circular filter plate according to this invention.

FIGS. 8A–8C illustrate three exemplary embodiments of a filter plate usable in a filter system according to this invention. FIG. 8A illustrates a first exemplary filter plate 800 including a transparent substrate 801 and continuously variable linear filter portion 802. The filter portion 802 has a dimension 803 along the expected motion direction 805, which is on the order or 15–20 mm in various exemplary embodiments. The wedge shape of the filter portion 802 is greatly exaggerated for clarity. Similar filter plates are commercially available from the SelectraBand™ family of linear variable filters from Optical Coating Laboratory Inc., Santa Rosa, Calif. The filter plate optionally includes a clear portion 804, shown in dashed outline, which includes no filter. In various exemplary embodiments of a filter system according to this invention, the clear portion 804 may be used to transmit broad band illumination from the filter system, when the clear portion 804 is suitably positioned relative to a broadband light source, such as the beam of light 430 shown in FIG. 2. In various other exemplary embodiments, the clear portion 804 is omitted, and the filter system may transmit broadband illumination by positioning the filter plate 800 outside of the broadband light source, such as the beam of light 430 shown in FIG. 2.

FIG. 8B illustrates a second exemplary filter plate 810 including a transparent substrate 811 and continuously variable linear filter portion 812. The filter plate 810 is similar to the filter plate 800, except that it includes a stepped wavelength filter portion 813 adjacent to the continuously variable linear filter portion 812. In the exemplary embodiment shown in FIG. 8B, the stepped wavelength filter portion 813 includes three "fixed" filters 814–816. "Fixed" filters means each filter has a center wavelength that does not vary across the filter. The relative thicknesses of filters 814–816 are greatly exaggerated for clarity. The spectral range of each of the fixed filters of the stepped wavelength filter portion 813 is chosen to span a useful portion of the entire illumination spectrum for the system as embodied in the continuously variable linear filter portion 812. By way of example, three primary color filters representing red, green, and blue portions of the visible spectrum could be used. Each of the filters 814–816 has a dimension 817 along the expected motion direction 805, which is greater than the spot size of the illumination applied to the filter plate by a filter system, such as the spot size of the beam of light 430 shown in FIG. 2. Thus, each filter of the stepped wavelength portion 813 will deliver a particular predetermined wavelength of illumination when the suitable positioned relative to light source such as the beam of light 430 shown in FIG. 2.

As previously described with reference to FIG. 3, in various exemplary embodiments, a desired illumination wavelength may be found by first coarsely stepping the illumination wavelength until a preliminary illumination setting is found that sufficiently matches the image characteristic criteria, and then the wavelength is finely stepped or continuously scanned in a restricted range surrounding the preliminary illumination setting until an illumination setting is found that optimizes the image characteristic criteria. The stepped wavelength portion 813 can be used to accelerate such a coarse search. In various other exemplary embodiments, instead of scanning over the entire dimension of the continuously variable linear filter portion 812 to coarsely cover a wide wavelength range, the fixed filters of the stepped wavelength portion 813 can be selected to encompass the same total wavelength range in a few discrete steps, over a much shorter dimension. Effectively, a plurality of pre-images can be obtained at a very high rate to yield advance information related to the reflectance/color properties or image characteristic criteria. The early knowledge permits rapid addressing to the appropriate portion of the spectrum on the continuously variable linear filter portion 812 where further tuning of illumination characteristics can be optimized.

FIG. 8C illustrates a third exemplary embodiment of a filter plate usable according to this invention. As shown in FIG. 8C, the circular filter plate 820 includes a transparent substrate 821 and continuously variable circular filter portion 822. The wedge shape of the filter portion 822 is greatly exaggerated for clarity. The circular filter plate 820 may positioned in rotation by a motor 846 according to well known methods, such that various portions of the continuously variable circular filter portion 822 are suitably positioned relative to a beam of light 830, which is similar to the beam of light 430 shown in FIG. 3, to provide essentially the same functions as the previously described continuously variable linear filters in a filter system according to this invention.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for operating a vision system to determine a desired illumination wavelength control parameter, the vision system comprising at least one illumination source having a controllable, continuously variable filter and an imaging system, the desired illumination wavelength control parameter usable to acquire an image that has a desired image characteristic in a region of interest of a workpiece, the method comprising:
    controlling the continuously variable filter according to a current illumination wavelength control parameter;
    illuminating at least the region of interest with light filtered by the controlled, continuously variable filter;
    acquiring an image of the illuminated region of interest of the workpiece;
    determining if the acquired image has an adequate image characteristic in the region of interest; and
    determining the desired illumination wavelength control parameter based on at least one acquired image having the adequate image characteristic in the region of interest.

2. The method of claim 1, further comprising:
    modifying the current illumination wavelength control parameter at least if the acquired image does not have the adequate image characteristic in the region of interest; and
    repeating the controlling, illuminating, and adequate image characteristic determining steps for each modified current illumination wavelength control parameter until at least one acquired image has the adequate image characteristic in the region of interest.

3. The method of claim 2, wherein a plurality of acquired images have the adequate image characteristic and the desired illumination wavelength control parameter is determined based on the acquired image which has a best image characteristic in the region of interest.

4. The method of claim 2, wherein modifying the current illumination wavelength control parameter comprises:
    modifying the current illumination wavelength control parameter over a plurality of relatively coarsely spaced parameter values;
    selecting at least one coarsely spaced parameter value corresponding to at least one of an adequate image characteristic and a best image characteristic; and
    modifying the current illumination wavelength control parameter over a plurality of relatively finely spaced parameter values in the vicinity of the at least one selected coarsely spaced parameter value.

5. The method of claim 4, wherein the plurality of relatively coarsely spaced parameter values corresponds to approximately the full wavelength range of the continuously variable filter.

6. The method of claim 1, wherein:
    the vision system further comprises at least one image tool; and
    the image characteristic is evaluated based at least partly on the operation of at least one of the at least one image tool.

7. The method of claim 1, further comprising at least partially automatically operating the vision system to determine the desired illumination wavelength control parameter.

8. The method of claim 1, wherein acquiring the image of the illuminated region of interest is initiated in response to a state of the controlled, continuously variable filter.

9. The method of claim 1, further comprising:
    generating at least one of a part program, at least one inspection program control instruction, and at least one controllable lighting system control instruction based on the determined desired illumination wavelength control parameter.

10. The method of claim 9, further comprising generating at least one of a part program, at least one inspection program control instruction, and at least one controllable lighting system control instruction based on an actual image characteristic of at the least one acquired image having the adequate image characteristic in the region of interest.

11. The method of claim 9, further comprising:
    performing an inspection operation on a similar workpiece in a corresponding region of interest based on at least one of the generated at least one of the part program, the at least one inspection program control instruction, and the at least one controllable lighting system control instruction.

12. The method of claim 1, wherein the current illumination wavelength control parameter corresponds to at least one of a position and a wavelength of the continuously variable filter.

13. The method of claim 1, wherein the region of interest of the workpiece contains at least two differently colored features corresponding to at least two respective desired image characteristics, further comprising repeating the controlling, illuminating, acquiring and both determining steps for each respective desired image characteristic.

14. The method of claim 1, wherein the vision system further comprises a spectral sensor, the method further comprising:
    illuminating at least the region of interest with relatively broadband illumination;
    determining a spectral sensing result for light arising from at least the region of interest under broadband illumination; and
    determining a current illumination wavelength control parameter based on the spectral sensing result.

15. The method of claim 14, further comprising:
modifying the current illumination wavelength control parameter at least if the acquired image does not have the adequate image characteristic in the region of interest; and
repeating the controlling, illuminating, and adequate image characteristic determining steps for each modified current illumination wavelength control parameter until at least one acquired image has the adequate image characteristic in the region of interest.

16. The method of claim 15, wherein a plurality of acquired images have the adequate image characteristic and the desired illumination wavelength control parameter is determined based on the acquired image which has a best image characteristic in the region of interest.

17. The method of claim 15, wherein the spectral sensing result indicates a plurality of intensity peaks corresponding to a plurality of peak wavelengths and the modifying step comprises modifying the current illumination wavelength control parameter based on a peak wavelength not used previously as a basis for an illumination wavelength control parameter.

18. A method for operating a vision system to perform an inspection operation using a desired illumination in a region of interest of a workpiece, the vision system comprising at least one illumination source having a controllable, continuously variable filter and an imaging system, the desired illumination usable to acquire an image that has a desired image characteristic in the region of interest, the method comprising:
controlling the continuously variable filter according to a current illumination wavelength control parameter;
illuminating at least the region of interest with light filtered by the controlled, continuously variable filter;
acquiring an image of the illuminated region of interest of the workpiece;
determining if the acquired image has an adequate image characteristic in the region of interest; and
operating the vision system to perform the inspection operation if the at least one acquired image has the adequate image characteristic in the region of interest.

19. The method of claim 18, wherein the vision system further comprises a spectral sensor, the method further comprising:
illuminating at least the region of interest with relatively broadband illumination;
determining a spectral sensing result for light arising from at least the region of interest under broadband illumination; and
determining the current illumination wavelength control parameter based on the spectral sensing result.

20. The method of claim 18, wherein:
the vision system further comprises at least one image tool; and
at least one of the inspection operation, the region of interest and the desired image characteristic are defined by a corresponding image tool.

21. The method of claim 20, further comprising:
manually selecting the corresponding image tool; and
manually positioning the corresponding image tool.

22. The method of claim 20, further comprising at least partially automatically selecting and positioning the corresponding tool.

23. The method of claim 18, wherein the image characteristic in the region of interest comprises at least one of a contrast, an intensity, and a gradient corresponding to an edge feature included in the region of interest.

24. A vision system comprising:
an imaging system;
a control system; and
at least one tunable illumination source for illuminating at least a region of interest of a workpiece to be imaged by the imaging system, the tunable illumination source comprising:
a filter plate including a continuously variable filter,
a broadband light source arranged to illuminate an illumination spot in the plane of the continuously variable filter, and
a positioning apparatus that moves the filter plate at least approximately parallel to the plane of the continuously variable filter and positions the continuously variable filter relative to the illumination spot with high position resolution; wherein:
the tunable illumination source is controllable to provide narrowband illumination centered at any narrowband illumination wavelength within a range provided by the continuously variable filter; and
the control system is operable to control the narrowband illumination provided by the tunable illumination source, to control the imaging system to acquire respective images illuminated by respective narrowband illumination wavelengths, and to perform an inspection operation in the region of interest of an acquired image corresponding to a respective narrowband illumination wavelength when the acquired image has an adequate image characteristic in the region of interest.

25. The vision system of claim 24, wherein the control system is further operable to at least partially automatically evaluate whether an acquired image has the adequate image characteristic in the region of interest, and to at least partially automatically modify the narrowband illumination wavelength provided by the tunable illumination source and to control the imaging system to acquire a respective image illuminated by the modified narrowband illumination wavelength, until at least one acquired image has the adequate image characteristic in the region of interest.

26. The vision system of claim 24, further comprising at least one image tool, wherein the image characteristic is evaluated based at least partly on an operation of the image tool.

27. The vision system of claim 24, wherein the control system is operable to control the imaging system to initiate acquiring an image illuminated by a respective narrowband illumination wavelength based upon a position of the positioning apparatus reaching a state adequately corresponding to a current illumination wavelength control parameter.

28. The vision system of claim 24, wherein the control system is further operable to generate at least one of a part program, at least one inspection program control instruction, and at least one controllable lighting system control instruction based on the respective narrowband illumination wavelength corresponding to an acquired image that has the adequate image characteristic in the region of interest.

29. The vision system of claim 28, wherein the control system is further operable to generate at least one of a part program, at least one inspection program control instruction, and at least one controllable lighting system control instruction based on the actual image characteristic of the acquired image that has the adequate image characteristic in the region of interest.

30. The vision system of claim 24, further comprising a spectral sensor usable to receive light from the workpiece and output a spectral sensing result, wherein the control system is further operable to control a light source of the vision system to illuminate at least the region of interest with relatively broadband illumination, to receive a spectral sensing result from the spectral sensor for light arising from at least the region of interest under the relatively broadband illumination, and to control the tunable illumination source to provide a narrowband illumination wavelength corresponding to an intensity peak of the spectral sensing result.

31. The vision system of claim 30, further comprising a beamsplitter arranged in a light path between the region of interest and a camera of the imaging system, the beamsplitter directing a portion of the light arising from at least the region of interest under the relatively broadband illumination to the spectral sensor.

32. The vision system of claim 30, further comprising an adjustable aperture arranged to restrict the light reaching the spectral sensor such that the spectral sensing result is determined primarily by light arising from the region of interest.

33. The vision system of claim 24, the filter plate further comprising a stepped wavelength filter portion including a plurality of fixed filters having respective center wavelengths, wherein:
the control system is further operable to control the tunable illumination source and the imaging system to acquire a preliminary set of images corresponding to at least some of the plurality of fixed filters, to evaluate which of the preliminary set of images provides the best image characteristic in the region of interest, to control the tunable illumination source to provide an initial narrowband illumination wavelength based on the center wavelength of the fixed filter corresponding to the best image characteristic, to at least partially automatically evaluate whether an acquired image corresponding to the initial narrowband illumination wavelength has an adequate image characteristic in the region of interest and to at least partially automatically modify the narrowband illumination wavelength provided by the tunable illumination source and control the imaging system to acquire respective images illuminated by the modified narrowband illumination wavelength, until at least one acquired image has an adequate image characteristic in the region of interest.

34. The vision system of claim 24, wherein the at least one tunable illumination source comprises at least one of a stage light, a coaxial light, a ring light and a diffuse light source directing toward a field of view of the imaging system.

35. The vision system of claim 24, wherein the at least one tunable illumination source comprises a filter that removes heat from a beam path of the broadband light source before the beam path reaches the plane of the continuously variable filter.

36. The vision system of claim 24, wherein:
the positioning apparatus comprises a linear positioning apparatus,
the continuously variable filter is a linear continuously variable filter, and
each narrowband illumination wavelength is selectable using at most a position of the linear positioning apparatus.

37. The vision system of claim 24, wherein:
the positioning apparatus comprises a rotary positioning apparatus,
the continuously variable filter is a circular continuously variable filter, and
each narrowband illumination wavelength is selectable using at most a position of the rotary positioning apparatus.

* * * * *